(12) United States Patent
Dulac

(10) Patent No.: US 7,801,303 B2
(45) Date of Patent: Sep. 21, 2010

(54) VIDEO ON DEMAND IN A BROADCAST NETWORK

(75) Inventor: Stephen P. Dulac, Santa Clarita, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 903 days.

(21) Appl. No.: 10/790,466

(22) Filed: Mar. 1, 2004

(65) Prior Publication Data

US 2005/0190947 A1 Sep. 1, 2005

(51) Int. Cl.
| | |
|---|---|
| H04N 7/167 | (2006.01) |
| H04N 7/16 | (2006.01) |
| H04N 7/173 | (2006.01) |
| G06F 21/00 | (2006.01) |
| G06F 7/04 | (2006.01) |
| G06F 17/30 | (2006.01) |

(52) U.S. Cl. .................. 380/200; 705/54; 725/1; 725/22; 725/31; 725/86; 726/2; 726/26

(58) Field of Classification Search ............ 380/200, 380/211, 212, 231; 705/50, 52–54, 77
See application file for complete search history.

(56) References Cited

U.S. PATENT DOCUMENTS

| | | | |
|---|---|---|---|
| 4,605,961 A | 8/1986 | Frederiksen | |
| 4,613,901 A | 9/1986 | Gilhousen et al. | |
| 4,633,309 A | 12/1986 | Li et al. | |
| 4,675,732 A | 6/1987 | Oleson | |
| 4,694,490 A * | 9/1987 | Harvey et al. | 380/234 |
| 4,866,769 A | 9/1989 | Karp | |
| 4,866,787 A | 9/1989 | Olesen | |
| 5,033,084 A | 7/1991 | Beecher | |
| 5,132,992 A * | 7/1992 | Yurt et al. | 375/240 |
| 5,168,353 A | 12/1992 | Walker et al. | |
| 5,172,413 A | 12/1992 | Bradley et al. | |
| 5,199,066 A | 3/1993 | Logan | |
| 5,301,245 A | 4/1994 | Endoh | |
| 5,301,352 A | 4/1994 | Nakagawa et al. | |
| 5,357,276 A | 10/1994 | Banker et al. | |

(Continued)

FOREIGN PATENT DOCUMENTS

EP 0936812 A1 8/1999

(Continued)

OTHER PUBLICATIONS

"Multicast Video on Demand Services," Huadong Ma, Kang G. Shin, ACM SIGCOMM Computer Communication Review vol. 32 Issue 1 Jan. 2002 pp. 31-43 ACM Press New York, NY, USA.*

(Continued)

Primary Examiner—Nasser Moazzami
Assistant Examiner—Oscar A Louie

(57) ABSTRACT

The present invention is a video on demand service enabled from a near video on demand service. A desired program is split into portions, or clips. The first clip is delivered a priori to the customer's Digital Video Recorder (DVR) using a hidden channel and it is made available for purchase on demand. The remaining portion is broadcast regularly using the start time of the Near Video On Demand service, for as long as the program is available for Video On Demand purchase. Upon purchase, the remaining portion is authorized for capture by the DVR. The clips are spliced together upon playback to form a complete program.

28 Claims, 2 Drawing Sheets

U.S. PATENT DOCUMENTS

| | | |
|---|---|---|
| 5,371,551 A | 12/1994 | Logan et al. |
| 5,386,587 A | 1/1995 | Yuzawa |
| 5,396,293 A | 3/1995 | Shellard |
| 5,421,031 A | 5/1995 | De Bey |
| 5,438,423 A | 8/1995 | Lynch et al. |
| 5,440,336 A | 8/1995 | Buhro et al. |
| 5,495,531 A | 2/1996 | Smiedt |
| 5,506,902 A | 4/1996 | Kubota |
| 5,557,541 A | 9/1996 | Schulhof et al. |
| 5,565,805 A | 10/1996 | Nakagawa et al. |
| 5,583,937 A * | 12/1996 | Ullrich et al. ............... 380/211 |
| 5,586,264 A | 12/1996 | Belknap et al. |
| 5,592,551 A | 1/1997 | Lett et al. |
| 5,592,651 A | 1/1997 | Rackman |
| 5,594,491 A | 1/1997 | Hodge et al. |
| 5,619,247 A | 4/1997 | Russo |
| 5,640,453 A | 6/1997 | Schuchman et al. |
| 5,642,418 A | 6/1997 | Farris et al. |
| 5,663,896 A | 9/1997 | Aucsmith |
| 5,675,390 A | 10/1997 | Schindler et al. |
| 5,677,895 A | 10/1997 | Mankovitz |
| 5,701,383 A | 12/1997 | Russo et al. |
| 5,701,582 A | 12/1997 | De Bey |
| 5,710,970 A | 1/1998 | Walters et al. |
| 5,715,315 A | 2/1998 | Handelman |
| 5,715,403 A | 2/1998 | Stefik |
| 5,721,829 A | 2/1998 | Dunn et al. |
| 5,724,646 A | 3/1998 | Ganek et al. |
| 5,729,280 A | 3/1998 | Inoue et al. |
| 5,734,853 A * | 3/1998 | Hendricks et al. ........... 715/716 |
| 5,748,732 A | 5/1998 | Le Berre et al. |
| 5,761,302 A | 6/1998 | Park |
| 5,764,762 A | 6/1998 | Kazmierczak et al. |
| 5,784,095 A | 7/1998 | Robbins et al. |
| 5,790,663 A | 8/1998 | Lee et al. |
| 5,793,971 A * | 8/1998 | Fujita et al. ................. 725/101 |
| 5,805,699 A | 9/1998 | Akiyama et al. |
| 5,826,165 A | 10/1998 | Echeita et al. |
| 5,831,664 A | 11/1998 | Wharton et al. |
| 5,845,240 A | 12/1998 | Fielder |
| 5,850,218 A | 12/1998 | LaJoie et al. |
| 5,864,747 A | 1/1999 | Clark et al. |
| 5,867,207 A | 2/1999 | Chaney et al. |
| 5,899,582 A | 5/1999 | DuLac |
| 5,912,969 A | 6/1999 | Sasamoto et al. |
| 5,914,941 A | 6/1999 | Janky |
| 5,926,205 A | 7/1999 | Krause et al. |
| 5,930,215 A | 7/1999 | Fite et al. |
| 5,930,802 A | 7/1999 | Lee |
| 5,933,500 A | 8/1999 | Blatter et al. |
| 5,936,660 A | 8/1999 | Gurantz |
| 5,937,067 A | 8/1999 | Thatcher et al. |
| 5,953,418 A | 9/1999 | Bock et al. |
| 5,966,186 A | 10/1999 | Shigihara et al. |
| 5,973,756 A | 10/1999 | Erlin |
| 5,978,649 A | 11/1999 | Kahn |
| 5,987,501 A | 11/1999 | Hamilton et al. |
| 5,999,628 A | 12/1999 | Chan |
| 5,999,629 A | 12/1999 | Heer et al. |
| 6,005,937 A | 12/1999 | Lee |
| 6,011,511 A | 1/2000 | Chuong et al. |
| 6,025,868 A | 2/2000 | Russo |
| 6,055,314 A * | 4/2000 | Spies et al. .................. 380/228 |
| 6,055,566 A | 4/2000 | Kikinis |
| 6,061,451 A | 5/2000 | Muratani et al. |
| 6,061,452 A | 5/2000 | Suzuki |
| 6,069,647 A | 5/2000 | Sullivan et al. |
| 6,072,873 A | 6/2000 | Bewick |
| 6,072,982 A | 6/2000 | Haddad |
| 6,075,330 A | 6/2000 | Terk |
| 6,091,883 A * | 7/2000 | Artigalas et al. .............. 386/83 |
| 6,097,441 A | 8/2000 | Allport |
| 6,105,134 A | 8/2000 | Pinder et al. |
| 6,144,400 A | 11/2000 | Ebisawa |
| 6,148,081 A * | 11/2000 | Szymanski et al. ............ 380/33 |
| 6,157,719 A | 12/2000 | Wasilewski et al. |
| 6,157,949 A | 12/2000 | Cheng et al. |
| 6,169,879 B1 | 1/2001 | Perlman |
| 6,202,211 B1 | 3/2001 | Williams, Jr. |
| 6,229,895 B1 | 5/2001 | Son et al. |
| 6,240,401 B1 | 5/2001 | Oren et al. |
| 6,263,504 B1 * | 7/2001 | Ebisawa ...................... 725/101 |
| 6,266,481 B1 | 7/2001 | Lee et al. |
| 6,286,142 B1 | 9/2001 | Ehreth |
| 6,288,716 B1 | 9/2001 | Humpleman et al. |
| 6,289,455 B1 | 9/2001 | Kocher et al. |
| 6,317,883 B2 | 11/2001 | Marics |
| 6,317,884 B1 | 11/2001 | Eames et al. |
| 6,370,688 B1 | 4/2002 | Hejna, Jr. |
| 6,381,747 B1 * | 4/2002 | Wonfor et al. ............... 725/104 |
| 6,385,596 B1 | 5/2002 | Wiser et al. |
| 6,398,245 B1 | 6/2002 | Gruse et al. |
| 6,415,031 B1 | 7/2002 | Colligan et al. |
| 6,437,836 B1 | 8/2002 | Huang et al. |
| 6,456,985 B1 | 9/2002 | Ohtsuka |
| 6,466,671 B1 | 10/2002 | Maillard et al. |
| 6,466,921 B1 | 10/2002 | Cordery et al. |
| 6,473,858 B1 | 10/2002 | Shimomura et al. |
| 6,480,667 B1 | 11/2002 | O'Connor |
| 6,487,663 B1 | 11/2002 | Jaisimha et al. |
| 6,487,722 B1 | 11/2002 | Okura et al. |
| 6,496,980 B1 * | 12/2002 | Tillman et al. ................. 725/90 |
| 6,502,139 B1 | 12/2002 | Birk et al. |
| 6,510,519 B2 | 1/2003 | Wasilewski et al. |
| 6,516,465 B1 | 2/2003 | Paskins |
| 6,519,693 B1 | 2/2003 | De Bey |
| 6,519,772 B1 | 2/2003 | Bopardikar |
| 6,523,114 B1 | 2/2003 | Barton |
| 6,530,085 B1 | 3/2003 | Perlman |
| 6,542,870 B1 | 4/2003 | Matsumoto |
| 6,543,053 B1 | 4/2003 | Li et al. |
| 6,550,011 B1 | 4/2003 | Sims, III |
| 6,560,340 B1 | 5/2003 | Akins et al. |
| 6,574,609 B1 | 6/2003 | Downs et al. |
| 6,611,812 B2 | 8/2003 | Hurtado et al. |
| 6,654,547 B1 | 11/2003 | Maeda et al. |
| 6,655,580 B1 | 12/2003 | Ergo et al. |
| 6,681,326 B2 | 1/2004 | Son et al. |
| 6,701,528 B1 * | 3/2004 | Arsenault et al. .............. 725/89 |
| 6,748,080 B2 | 6/2004 | Russ et al. |
| 6,851,055 B1 | 2/2005 | Boyle et al. |
| 6,853,728 B1 * | 2/2005 | Kahn et al. .................. 380/239 |
| 6,889,208 B1 | 5/2005 | Okabe et al. |
| 6,934,963 B1 | 8/2005 | Reynolds et al. |
| 6,961,858 B2 | 11/2005 | Fransdonk |
| 6,993,499 B2 | 1/2006 | Gagnon et al. |
| 7,035,827 B2 | 4/2006 | Ezaki |
| 7,096,271 B1 | 8/2006 | Omoigui et al. |
| 7,191,155 B2 | 3/2007 | Maruyama et al. |
| 7,191,335 B1 | 3/2007 | Maillard |
| 7,240,359 B1 | 7/2007 | Sie et al. |
| 7,370,342 B2 | 5/2008 | Ismail et al. |
| 7,549,058 B1 | 6/2009 | Wang et al. |
| 2001/0001876 A1 | 5/2001 | Morgan et al. |
| 2001/0046299 A1 | 11/2001 | Wasilewski et al. |
| 2002/0001386 A1 | 1/2002 | Akiyama |
| 2002/0023219 A1 | 2/2002 | Treffers et al. |
| 2002/0048367 A1 | 4/2002 | Maillard |
| 2002/0056112 A1 | 5/2002 | Dureau et al. |
| 2002/0083438 A1 | 6/2002 | So et al. |
| 2002/0112243 A1 | 8/2002 | Hunter et al. |
| 2002/0170054 A1 | 11/2002 | Kudelski et al. |
| 2002/0184628 A1 | 12/2002 | Kim et al. |
| 2003/0018980 A1 * | 1/2003 | Gorbatov et al. ............. 725/133 |

| | | | |
|---|---|---|---|
| 2003/0040962 A1 | 2/2003 | Lewis | |
| 2003/0061477 A1 | 3/2003 | Kahn et al. | |
| 2003/0105718 A1 | 6/2003 | Hurtado et al. | |
| 2003/0110132 A1 | 6/2003 | Sako | |
| 2003/0145183 A1 | 7/2003 | Muehring | |
| 2003/0174844 A1 | 9/2003 | Candelore | |
| 2003/0228911 A1 | 12/2003 | Dernis et al. | |
| 2004/0068721 A1 | 4/2004 | O'Neill et al. | |
| 2005/0050333 A1 | 3/2005 | Yeap et al. | |
| 2005/0216942 A1 | 9/2005 | Barton | |
| 2005/0235361 A1 | 10/2005 | Alkove et al. | |
| 2006/0126833 A1 | 6/2006 | O'Leary et al. | |
| 2006/0168663 A1 | 7/2006 | Viljoen et al. | |
| 2006/0179489 A1 | 8/2006 | Mas Ribes | |
| 2006/0212928 A1 | 9/2006 | Maino et al. | |
| 2006/0218620 A1 | 9/2006 | Nadarajah et al. | |
| 2007/0009235 A1 | 1/2007 | Walters et al. | |
| 2007/0058924 A1 | 3/2007 | Yeh | |
| 2007/0118606 A1 | 5/2007 | Duncan et al. | |
| 2007/0219918 A1 | 9/2007 | Schull | |
| 2007/0245010 A1 | 10/2007 | Arn et al. | |
| 2007/0294422 A1 | 12/2007 | Zuckerman et al. | |
| 2008/0019529 A1* | 1/2008 | Kahn et al. | 380/281 |
| 2008/0168523 A1 | 7/2008 | Ansari et al. | |
| 2008/0172593 A1 | 7/2008 | Rainish et al. | |
| 2008/0288998 A1 | 11/2008 | Locket et al. | |
| 2009/0080653 A1 | 3/2009 | Candelore et al. | |
| 2009/0106802 A1 | 4/2009 | Zuckerman et al. | |
| 2010/0027550 A1 | 2/2010 | Candelore et al. | |

FOREIGN PATENT DOCUMENTS

| | | |
|---|---|---|
| EP | 0975165 A2 | 1/2000 |
| EP | 0989557 A1 | 3/2000 |
| EP | 1156676 A2 | 11/2001 |
| EP | 1304871 A2 | 4/2003 |
| EP | 1369152 A2 | 12/2003 |
| JP | 06351023 A | 12/1994 |
| JP | 11136708 A | 5/1999 |
| WO | WO 92/11713 | 7/1992 |
| WO | WO 99/18729 | 4/1999 |
| WO | WO 00/13412 | 3/2000 |
| WO | WO 00/19294 | 4/2000 |
| WO | WO 01/43444 A2 | 6/2001 |
| WO | WO 01/98920 | 12/2001 |
| WO | WO 02/15184 A1 | 2/2002 |
| WO | WO 02/065750 A2 | 8/2002 |
| WO | WO 03/103293 | 12/2003 |

OTHER PUBLICATIONS

"The Split and Merge Protocol for Interactive Video-on-Demand," Wanjiun Liao, Victor O.K. Li, IEEE Multimedia, vol. 4 No. 4 Index and pp. 51-62, Oct.-Dec. 1997.*

"Interaction with broadcast video," Tantaoui et al, International Multimedia Conference Preceedings of the tenth ACM international conference on Multimedia pp. 29-38 ACM Press New York, NY, USA 2002 ISBN: 1-58113-620-X.*

"Protecting Vo D the easier way," Carsten et al, International Multimedia Conference Preceedings of the sixth ACM international conference on Multimedia pp. 21-28 ACM Press New York, NY, USA 2002 ISBN: 0-201-30990-4.*

"Multicast Video on Demand Services," Ma et al., ACM SIGCOMM Computer Communication Review, Vol. 32 Issue 1 pp. 31-43 Jan. 2002.*

"The Split and Merge Protocol for Interactive Video-on-Demand," Liao et al., IEEE 1997.*

P. Venkat Rangan, et al., "Designing an On-Demand Multimedia Service", IEEE Communications Magazine, Jul. 1992, vol. 30, No. 7, title page and pp. 56-64.

Wanjiun Liao, et al., "The Split and Merge Protocol for Inter-active Video-On-Demand", IEEE MultiMedia, Oct.-Dec. 1997, vol. 4, No. 4, Index and pp. 51-62.

Robert Johnston, et al., "A Digital Television Sequence Store", IEEE Transactions on Communications, May 1978, vol. COM-26, No. 5, Index and pp. 594-600.

Proposed SMPTE Standard for Television—Splice Points for MPEG-2 Transport Streams, SMPTE Journal, Oct. 1998, SMPTE 312M, pp. 916-925.

Michael Robin, et al., "Digital Television Fundamentals—Design and Installation of Video and Audio Systems", McGraw-Hill, Chapter 8, title page(s) and pp. 345-425.

Yongchen Li, et al., "Security Enhanced MPEG Player", IEEE, 1996, pp. 169-175.

Fink, Ready to take the dive? It's fast-forward as new DVD and Divx formats hit market (including graphic: Home video: the next generation plus: Some selections that show off the system), York.

Sin-Joo Lee, et al., "A Survey of Watermarking Techniques Applied to Multimedia", IEEE, 2001, pp. 272-277.

PocketTV Brings Video to Palm-size PC, Mar. 9, 2000, 2 pages.

1st Report of EBU/SMPTE Task Force for Harmonized Standards for the Exchange of Television Program Material as Bit Streams, May 6, 1997, Version 1.30, pp. 1-73.

B. Schneier, Appllied Cryptography-Protocols, Algorithms, and Source Code in C, 2nd Edition, pp. 216-222, 357-362.

HP Jornada 430/430se Palm-size PC: User's Guide, Hewlett Packard, 1999, pp. 7-9.

PocketTV-MPEG movie player for PocketPC and WinCE, May 17, 2000, MPEG TV, LLC, retrieved from URL: http://web.archive.org/web/ 200006210123803/www.mpegtv.com/wince/pockettv/index.html.

Download PockeTV (beta) for WinCE, Nov. 3, 1999, MPEG TV, LLC, retrieved from URL: http://web.archive.org/web/19991127093158/www.mpegtv.com/wince/pockettv/index.htlml.

Anerousis, N., "SkyCast: The Satellite Digital Broadcast Relay Service", AT&T Labs Research, unpublished manuscript, 1999, pp. 1-4.

"PKCS #1 v2.1: RSA Cryptography Standard"; Jun. 14, 2002; RSA Laboratories; 61 pages.

Tsubakiyama, Hideki and Koga, Keiichiro; "Security for Information Data Broadcasting System with Conditional-Access Control"; IEEE; 1993; pp. 164-170.

EBU Project Group B/CA; "Functional Model of a Conditional Access System"; EBU Technical Review; Jun. 10, 1995; pp. 64-77.

Non-final Office Action dated Sep. 25, 2007 in U.S. Appl. No. 10/758,865 filed Jan. 16, 2004 by Kahn et al.

Final Office Action dated Aug. 20, 2007 in U.S. Appl. No. 10/758,818 filed Jan. 16, 2004 by Kahn et al.

Final Office Action dated Oct. 10, 2007 in U.S. Appl. No. 10/790,466 filed Mar. 1, 2004 by Dulac et al.

Non-final Office Action dated Jan. 18, 2008 in U.S. Appl. No. 10/759,679 filed Jan. 19, 2004 by Arsenault et al.

Notice of Allowance dated Dec. 5, 2007 in U.S. Appl. No. 09/620,833 filed Jul. 21, 2000 by Kahn et al.

Notice of Allowance dated Dec. 10, 2007 in U.S. Appl. No. 09/960,824 filed Sep. 21, 2001 by Kahn et al.

Non-final Office Action dated Dec. 4, 2007 in U.S. Appl. No. 10/758,811 filed Jan. 16, 2004 by Kahn et al.

Final Office Action dated Jan. 23, 2008 in U.S. Appl. No. 09/620,772 filed Jul. 21, 2000 by Kahn et al.

Advisory Action dated Jan. 7, 2008 in U.S. Appl. No. 10/790,466 filed Mar. 1, 2004 by Dulac, Stephen P.

Non-final Office Action dated Aug. 5, 2008 in U.S. Appl. No. 10/759,679 filed Jan. 19, 2004 by Robert G. Arsenault et al.

EPO Communication dated Dec. 9, 2008 in European patent Application No. 05251218.3 filed Mar. 1, 2005 by Stephen P. Dulac.

Final Rejection dated Feb. 18, 2009 in U.S. Appl. No. 10/759,679 filed Jan. 19, 2004 by Robert G. Arsenault et al.

Non-final Office action dated Dec. 9, 2009 in U.S. Appl. No. 10/759,679 filed Jan. 19, 2004 by Robert G. Arsenault et al.

Final Rejection dated Jun. 8, 2010 in U.S. Appl. No. 10/759,679 filed Jan. 19, 2004 by Robert G. Arsenault et al.

* cited by examiner

VIDEO ON DEMAND IN A BROADCAST NETWORK

CROSS-REFERENCE TO RELATED APPLICATION

The present invention is cross-referenced to pending U.S. patent application Ser. No. 10/759,679 filed Jan. 26, 2000, entitled VIRTUAL VIDEO ON DEMAND USING MULTIPLE ENCRYPTED VIDEO SEGMENTS, which is a continuation of U.S. patent application Ser. No. 09/491,959 entitled VIRTUAL VIDEO ON DEMAND USING MULTIPLE ENCRYPTED VIDEO SEGMENTS, now issued as U.S. Pat. No. 6,701,528.

TECHNICAL FIELD

The present invention relates generally to a method for video on demand services in a broadcast network with digital video recorders and more particularly to delivering on demand video in segments over more than one delivery session.

BACKGROUND OF THE INVENTION

Broadcast networks having digital video recorders provide video services that allow subscribers to order programs. A subscriber typically accesses a program library and requests a desired program. Typically, the requested program is delivered to a digital video recorder (DVR) at the subscriber location and recorded for viewing over a predetermined period of time.

Near video on demand (NVOD) service offers programs which a subscriber can choose to purchase and view at a predetermined time. The programs have regular start times, for example every half-hour, and a subscriber enjoys the purchased program at scheduled times. NVOD services have hardware based encryption methods applied to the digital broadcast signal, making them difficult to defeat, thereby limiting access to the programming to purchasers only. Impulse pay per view (IPPV) programming is another type of NVOD but allows a subscriber to purchase the program using their remote control.

Video on demand (VOD) service provides a subscriber with virtually instantaneous access to the program for viewing. The customer doesn't have to wait for a scheduled start time before viewing the program. For customers with a DVR, the VOD service can be offered by delivering a collection of programs a priori, or without a specific request, to a subscriber's DVR and then offering those programs for purchase and viewing upon the subscriber's demand virtually independent of a scheduled viewing time.

However, the added advantage of purchasing and watching a program without having to request the program in advance is not without significant drawbacks. The subscriber's DVR has limited storage capacity and therefore, the quantity of programs stored on the DVR is limited to the DVR's available storage capacity. Therefore, to store all available programming choices results in unpurchased and unwanted programming being unnecessarily stored on the customer's DVR.

Another drawback associated with video on demand service is the security risk associated with delivering and storing the program content. Typically, the program content stored on the DVR is encrypted using software based encryption methods. A hacker can defeat the software based encryption methods of the stored programs, increasing the risk that the program content may be accessed without actually being purchased. Yet another drawback is the need to store the encrypted data on the DVR. For many VOD applications, a DVR must have the capability to store encrypted video, which is a feature that not all DVR's possess. This severely limits the availability of VOD services.

There is a need to provide VOD services while maintaining the security and wide variety of available program content associated with NVOD services.

SUMMARY OF THE INVENTION

The present invention enables VOD services for a subscriber from existing NVOD services while reducing the storage requirements on the subscriber's DVR and lowering the risk that the program content may be accessed without being purchased. The subscriber is making a selection from a program library for viewing upon demand without having to wait for scheduled viewing times. The video is provided on demand as a portion of the program is previously stored on the DVR and is available for immediate viewing. The remaining portion is delivered and stored on the DVR, commencing while the subscriber is viewing the previously stored segment.

The present invention is a video on demand service enabled from a near video on demand service. A desired program is split into portions, or clips. The first clip is delivered a priori to the customer's DVR and it is made available for purchase on demand. The remaining portion, which may be a clip or clips, is broadcast regularly using the start time of the NVOD service, for as long as the program is available for VOD purchase.

An object of the present invention is to reduce the storage requirements in the limited storage capacity of a subscriber's DVR. It is another object of the present invention to reduce the risk that the video on demand content may be accessed without being purchased. It is still another object of the present invention to use systems and methods already in place for NVOD services, IPPV services, and other network directed recordings, without the need for additional investment in order to provide VOD services.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention. In the drawings.

DETAILED DESCRIPTION OF PREFERRED EMBODIMENTS

Figure 1:
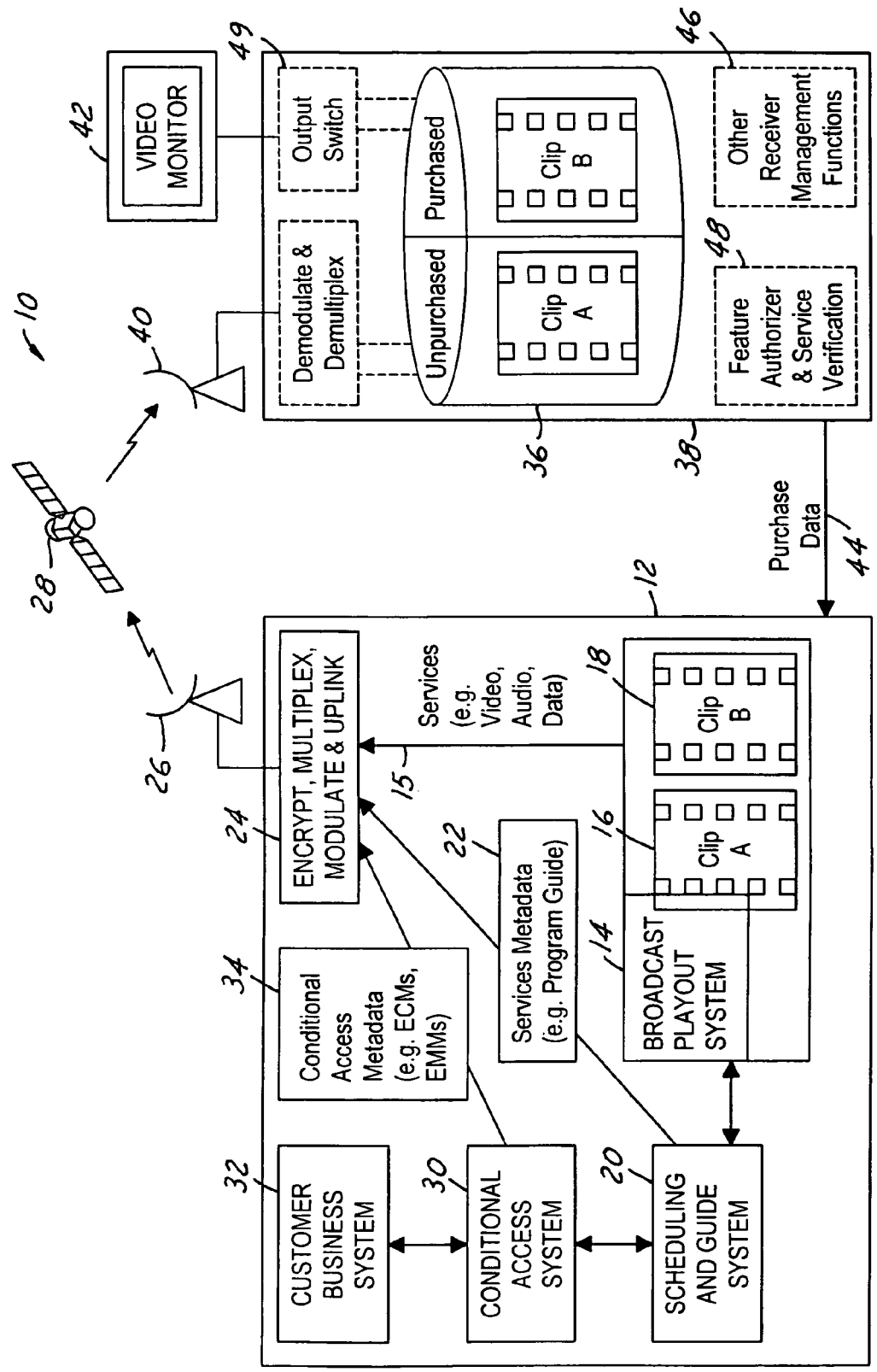
FIG. 1 is a block diagram of a video on demand service provided by a satellite broadcast network provider using a DVR.
Figure 2:
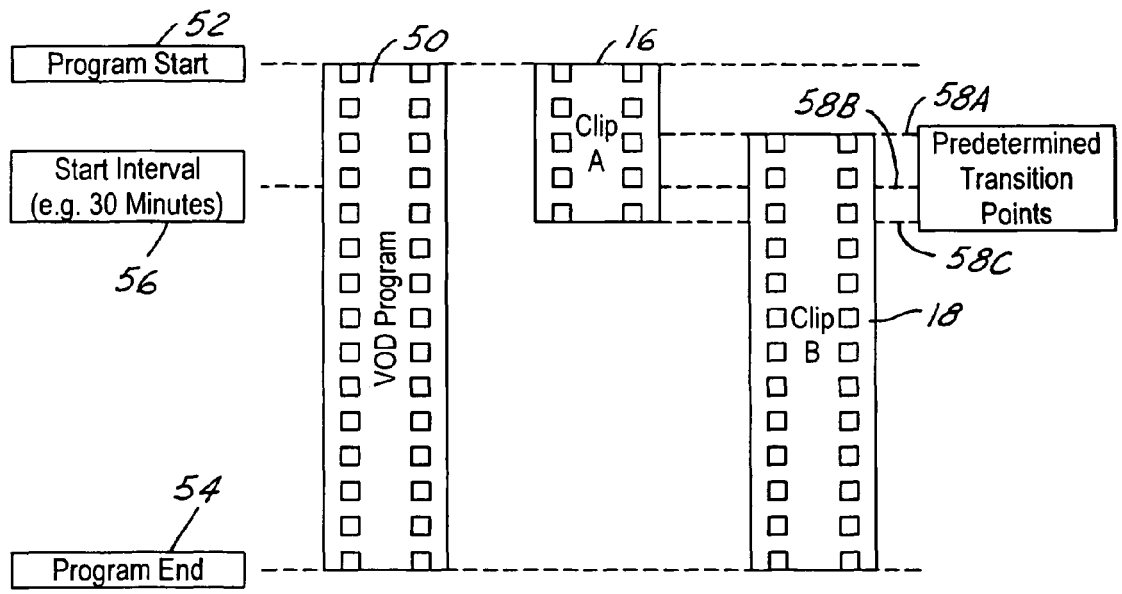
FIG. 2 is a diagram of the portions, or clips, of the video program.

The present invention is described herein with reference to FIGS. 1 and 2. FIG. 1 is a block diagram of a satellite broadcast network system 10 and is used for example purposes to describe one embodiment of the present invention. It should be noted that the present invention is not limited to satellite broadcast networks and one skilled in the art is capable of applying the present invention to other broadcast network providers without departing from the scope of the present invention.

The headend system 12 has a broadcast playout system 14 that contains the program content broadcast by the network system 10. Services 15 available from the broadcast playout system 14 are processed before uplink to a satellite 28 for broadcast. The program content contains the programs available for on demand purchase by a subscriber, or customer. The on demand program content is sectioned into at least two portions, clip A 16 and clip B 18.

A scheduling and guide system 20 contains the data about the program content that is to be made available to the subscriber for on demand purchase. The scheduling and guide system 20 provides services metadata 22, such as the interactive program guide to a processing module 24, where the data is encrypted, multiplexed, modulated and sent, by way of antenna 26, as an uplink to at least one satellite 28.

A conditional access system 30 processes and controls the data from the scheduling and guide system 20 and a customer business system 32, to provide conditional access metadata, such as entitlement control messages (ECM's) and entitlement management messages (EMM's), that are sent to the processing module 24 for encryption, multiplexing, modulating and uplink to the satellite 28.

At a remote subscriber location, there is a digital video recorder (DVR) 38 that is typically an integrated receiver/decoder (IRD) having digital video storage 36 capability, where the signals from the satellite 28 are received, usually by way of antenna 40, decoded and displayed on a video monitor 42. The signal broadcast from the satellite is received at the DVR 38 where it is demodulated and demultiplexed. The DVR need not have the capability to store encrypted video data in order to benefit from the VOD services of the present invention.

According to one embodiment of the present invention, a program portion, clip A 16, of the available on-demand program content, is broadcast and stored on the digital video recorder 38. Upon-purchase by a subscriber, the remainder of clip B 18 is sent to the DVR 38 for playback and recording. At any time after purchase, the purchase data 44 is sent to the headend system 12.

The first clip, clip A 16, is delivered a priori to the subscriber's DVR 38 in a manner that is hidden to the subscriber. The first clip is not stored as encrypted data on the DVR, but is either sent unencrypted, or sent as encrypted data and decrypted before being stored on the DVR. In either scenario, the first clip is stored on the DVR as unencrypted data, removing the necessity for the DVR to have the capability to store encrypted data.

Clip A 16 is sent individually using a predetermined channel, such as a "hidden channel", and then broadcast separately at another time, such as during the middle of the night. A "hidden channel" is a channel that is not displayed to a customer viewing the program guide, so there is no desire for a customer to tune to that particular channel. In this regard, a clip may be delivered on a channel that is not readily apparent to a customer, but is known to the receiver.

Because only a portion of the program, Clip A, is stored on the DVR 38, there is far less incentive for a hacker to attempt to "steal" the program for viewing.

A receiver management function 46 in the DVR 38 is responsible for deciding, based on received metadata, when it is appropriate to capture clip A 16 for a VOD program. It should be noted that a plurality of clip A's 16 from a variety of VOD programs may be bundled together for delivery to the DVR 36.

Conditional access control determines if the DVR is entitled to receive clip A 16 from the broadcast network. For example, if announced separately, clip A 16 may be received by a DVR 38 that has active DVR service, or some other service subscription level authorizing the receipt of clip A 16. A part of the NVOD broadcast, an ECM in the conditional access metadata 34, might indicate that decryption of clip A 16 is allowed by DVR's with active DVR service. A DVR feature authorizer and service verification function 48 is responsible for deciding, based on received metadata, when decryption of clip A 16 is allowed.

The length of clip A is nominally equal to the intervals between start times of the NVOD service. However, it may be greater or it could be less. If greater in length, multiple predetermined transition points are provided, allowing improved probability of a proper seamless transition from clip A to a succeeding clip, clip B 18 for example. If the length of clip A is shorter than the interval between start times, then the system may be introducing a period where the service may not be truly "on demand." However, the storage capacity demand of the DVR is still reduced.

The subsequent clip, Clip B 18, in the present example, must contain at least the remainder of the program. The subsequent clip, Clip B 18, may include the content provided in Clip A 16. Clip B 18 may contain the entire program for the purpose of NVOD broadcasts that serve non-DVR receivers as well. The DVR can present the VOD program for purchase to the subscriber. Clip B 19 may also include additional bonus content.

Referring to FIG. 2, an example of the division of the program 50 into Clip A 16 and Clip B 18 is shown. The length of clip A is measured from the program start 52. If clip A is longer than the start interval 56, thirty minutes in the present example, predetermined transition points 58A, 58B, and 58C are identified in Clip B. The end of Clip A is after the last predetermined transition point 58C of Clip B. The end 54 of the VOD program 50 coincides with the end of Clip B 18.

A subscriber will be able to use DVR functions such as fast forward and reverse. In the event that less than all the remaining program has been received and decrypted at the receiver, the subscriber will only be able to fast forward to the point that has at least been delivered. The result to the customer may be similar to what they would experience when attempting to fast forward through a "live" television broadcast.

Figure 3:
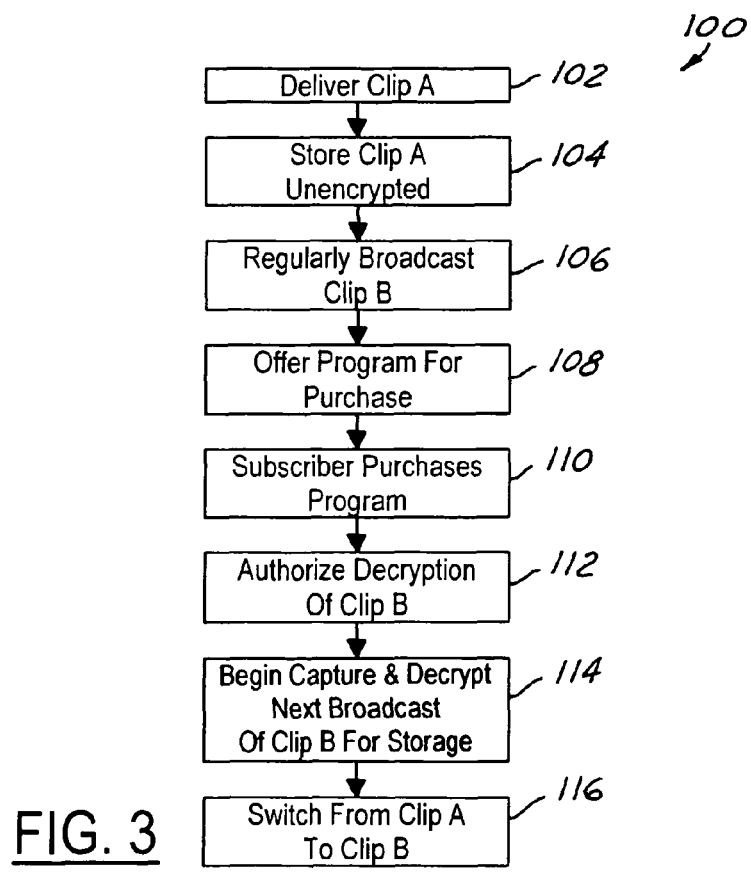
FIG. 3 is a flow chart of the method of the present invention.

Referring now to FIG. 3, a flow chart of the method 100 of the present invention is herein described. Clip A is delivered 102 and Clip A 16 is stored 104 as unencrypted data on the hard disk drive of the DVR. Clip B 18 is regularly broadcast 106, for example, with the scheduled NVOD broadcast. The VOD program is offered 108 for purchase. The offer may include additional information about the program such as movie reviews and additional description.

Promotional videos and "free" previews are other examples of additional bonus content that may be presented. The subscriber purchases 110 the VOD program and the DVR is authorized 112 to decrypt Clip B. The authorization may be from the IPPV mechanism for example. The DVR then schedules resources to begin capture and decryption 114 of the next available Clip B from the broadcast. Clip B is also stored as unencrypted data on the DVR. Once the next available Clip B broadcast has begun, the subscriber begins to play the program using Clip A stored on the DVR and the DVR switches 116 to clip B at the appropriate time. The customer is unaware of the transition and enjoys the remainder of the program uninterrupted.

The complete purchase of the program consists of Clip A and Clip B and then remains available on the DVR for additional playbacks in accordance with the rules set by the network operator for deletion. The DVR may continue to store Clip A and Clip B in their entirety and perform the switching between each clip upon each playback, or the DVR may splice the clips together and delete any overlap of the two clips after storage. The program need not be stored as encrypted data and is available for playback at any time within the network operator's rules. The purchase data is transferred in a known method, such as telephone, cable modem, high-speed connection, or wireless method, to the network operator for billing purposes.

The seamless switching from Clip A to Clip B is accomplished using triggers in the broadcast data. For example, the triggers would be delivered with the video in a form such as vertical blanking interval or MPEG data, or in the alternative, the triggers may be included with the services metadata. In any event, the delivery of triggers with the video requires additional processing prior to the broadcast to insert the triggers at the predetermined transition points. The DVR notes matching triggers and effects the switching from Clip A to Clip B using the output switch 49 function.

The invention covers all alternatives, modifications, and equivalents, as may be included within the spirit and scope of the appended claims.

What is claimed is:

1. A method of providing a video program in response to a demand by a subscriber, wherein the video program is repeatedly transmitted on one of a plurality of channels by a headend, each repeated transmission separated from a previous transmission by a predetermined period of time, the method comprising the steps of:
    inserting a trigger into the video program at a predetermined transition point;
    delivering a first portion of the video program available for viewing on demand, the first portion of the video program comprising the trigger inserted at the predetermined transition point;
    if reception and decryption of the received first portion of the video program is authorized, decrypting the first portion of the at least one video program;
    storing the decrypted first portion of the video program on a digital video recorder (DVR);
    offering the video program for purchase by the subscriber;
    accepting a subscriber demand to purchase the video program;
    retrieving the stored first portion of the video program from the DVR after accepting a subscriber demand to purchase the video program;
    authorizing capture and decryption of a remaining portion of the purchased video program from the headend;
    switching from the stored decrypted first portion of the at least one video program to the captured and decrypted remaining portion of the purchased video program at a time indicated by the trigger.

2. The method as claimed in claim 1, wherein said step of delivering a portion of at least one video program further comprises delivering a portion of at least one video program on a hidden channel.

3. The method as claimed in claim 1, wherein the remaining portion comprises less than all of the program and including at least the portion not stored in the first portion.

4. The method as claimed in claim 1, wherein said step of switching from the stored first unencrypted portion of the at least one video program to the remaining portion of the video program further comprises switching to the remaining portion at one of a plurality of predetermined transition points determined by the trigger.

5. The method of claim 1, wherein the trigger is included in a vertical blanking interval of the video program.

6. The method of claim 1, wherein the video program is associated with services metadata and the trigger is included with the services metadata.

7. The method of claim 1, wherein the DVR determines when to store the first portion of the at least one video program based on received metadata.

8. A method of purchasing a program on demand comprising the steps of:
    determining if reception of an encrypted first portion of the program is authorized according to a subscription service level;
    if reception of the encrypted first portion is authorized, receiving encrypted first portion of the program for purchase from a headend;
    determining if decryption of the received encrypted first portion is authorized based on received conditional access metadata
    if decryption of the received encrypted first portion is authorized, decrypting the received first portion of the program;
    storing the decrypted first portion of the program for later purchase on a subscriber's digital video recorder;
    offering the program for purchase;
    selecting the program for purchase;
    retrieving the stored decrypted first portion of the selected program from the subscriber's digital video recorder for viewing by the subscriber;
    receiving a remaining portion of the selected program from the headend;
    authorizing storage of the program by the subscriber's digital video recorder according to a subscription service level;
    if the storage of the program is authorized, splicing the decrypted first portion of the program with the remaining portion of the program to form a complete program;
    storing the complete program on the digital video recorder for a predetermined period of time.

9. The method as claimed in claim 8, wherein the step of receiving the encrypted first portion of the program further comprises receiving the encrypted first portion of the program over a channel that is hidden to the subscriber but recognized by the digital video recorder.

10. The method as claimed in claim 9, wherein the step of receiving the encrypted first portion of the program further comprises receiving information about the program in addition to the first encrypted portion.

11. The method as claimed in claim 10, wherein the information in addition to the first encrypted portion further comprises information selected from the group comprising promotional video, additional description about the program and program reviews.

12. The method as claimed in claim 11, further comprising the step of offering a free preview of the program from the stored decrypted first portion.

13. The method as claimed in claim 9, wherein said step of splicing the decrypted first portion of the selected program with the remaining portion of the program to form the complete program comprises the steps of:
    inserting triggers at predetermined transition points in the remaining portion of the program;
    delivering the inserted triggers with the remaining portion of the program;

identifying the inserted triggers at the digital video recorder for switching from the stored decrypted first portion of the program to the remaining portion of the program.

14. The method as claimed in claim 13, wherein the triggers are included with a service's metadata.

15. An apparatus configured to provide a program in response to a subscriber demand comprising:
a digital video recorder being an integrated receiver/decoder having digital video recording capabilities, the digital video recorder comprising;
means for determining if reception of a first portion of the program is authorized according to a subscription service level and for receiving the first portion of the program if authorized;
means for determining if decryption of the received first portion is authorized and for decrypting the received first portion if authorized based on received conditional access metadata;
means for accepting an offer to purchase the program;
means for retrieving the decrypted first portion from storage on the digital video recorder while retrieving a remaining portion of the program from a headend;
means for authorizing decryption of the remaining portion of the program; means for splicing the decrypted first portion of the at least one program with the remaining portion of the program to define a complete program;
means for storing the complete program on the digital video recorder.

16. The apparatus as claimed in claim 15, wherein the offer to purchase the program comprises a program guide stored on the digital video recorder.

17. The apparatus as claimed in claim 16, further comprising a channel hidden from the program guide but known by the digital video recorder for sending the first portion to the digital video recorder for storage thereon.

18. The apparatus as claimed in claim 15, wherein the means for splicing the first portion with the remaining portion further comprises triggers inserted into the remaining portion at predetermined transition points for identification by the digital video recorder as a point of transition between the first portion and the remaining portion.

19. The apparatus of claim 15, wherein at least a portion of the program is repeatedly transmitted on one of a plurality of channels, each repeated transmission separated from a previous transmission by a predetermined period of time.

20. The apparatus of claim 19, wherein the at least a portion of the program consists of the remaining portion of the program.

21. The apparatus of claim 19, wherein the at least a portion of the program comprises the entire program.

22. A method of providing at least one video program in response to a demand by a subscriber, wherein the video program is repeatedly transmitted on one of a plurality of channels by a headend, each repeated transmission separated from a previous transmission by a predetermined period of time, the method comprising the steps of:
inserting a trigger into the video program at a predetermined transition point;
delivering a first portion of the at least one video program available for viewing on demand;
storing the first portion of the video program as unencrypted data on a digital video recorder (DVR);
offering the at least one video program for purchase by the subscriber;
accepting a subscriber demand to purchase the at least one video program;
retrieving the stored first portion of the at least one video program from the DVR after accepting a subscriber demand to purchase the at least one video program;
authorizing capture and decryption of a remaining portion of the purchased at least one video program from the headend; and
switching from the stored first unencrypted portion of the at least one video program to the remaining portion of the purchased at least one video program at a time indicated by the trigger;
wherein the delivered first portion of the at least one video program is encrypted and includes conditional access metadata and the method further comprises the steps of:
determining if reception of the delivered first portion of the at least one video program is authorized according to a subscription service level;
if reception of the delivered first portion of the at least one video program is authorized, determining if decryption of the received first portion of the at least one video program is authorized based on received conditional access metadata including an entitlement control message; and
if decryption of the received and delivered first portion of the at least one video program is authorized, decrypting the first portion of the at least one video program to produce the unencrypted data before storing the unencrypted data on the DVR.

23. The method as claimed in claim 22, wherein said step of delivering the first portion of the at least one video program further comprises delivering the first portion of the at least one video program on a hidden channel.

24. The method as claimed in claim 22, wherein the remaining portion of the purchased video program comprises less than all of the at least one video program and including at least the portion not stored in the first portion of the at least one video program.

25. The method as claimed in claim 22, wherein said step of switching from the stored first portion of the at least one video program to the remaining portion of the video program further comprises switching to the remaining portion of the at least one video program at one of a plurality of predetermined transition points determined by the trigger.

26. The method of claim 22, wherein the trigger is included in a vertical blanking interval of the at least one video program.

27. The method of claim 22, wherein the at least one video program is associated with services metadata and the trigger is included with the services metadata.

28. The method of claim 22, wherein the DVR determines when to store the first portion of the at least one video program based on received metadata.

* * * * *